United States Patent
Jacobson

(10) Patent No.: US 11,748,515 B2
(45) Date of Patent: Sep. 5, 2023

(54) SYSTEM AND METHOD FOR SECURE LINKING OF ANONYMIZED DATA

(71) Applicant: Omnisient (RF) (Pty) Ltd, Salt River (ZA)

(72) Inventor: Jonathan Terrence Jacobson, Salt River (ZA)

(73) Assignee: Omnisient (RF) (Pty) Ltd, Salt River (ZA)

(*) Notice: Subject to any disclaimer, the term of this patent is extended or adjusted under 35 U.S.C. 154(b) by 224 days.

(21) Appl. No.: 17/481,533

(22) Filed: Sep. 22, 2021

(65) Prior Publication Data

US 2023/0088867 A1    Mar. 23, 2023

(51) Int. Cl.
G06F 21/62    (2013.01)
H04L 9/32    (2006.01)

(52) U.S. Cl.
CPC ........ G06F 21/6254 (2013.01); H04L 9/3213 (2013.01); H04L 9/3236 (2013.01)

(58) Field of Classification Search
CPC .. G06F 21/6254; H04L 9/3213; H04L 9/3236
USPC ........................................................ 726/26
See application file for complete search history.

(56) References Cited

U.S. PATENT DOCUMENTS

| | | |
|---|---|---|
| 7,606,788 B2 | 10/2009 | Samar |
| 8,442,218 B2* | 5/2013 | Schneider ............. H04L 9/0643 380/38 |
| 9,805,215 B1 | 10/2017 | Johansson et al. |
| 10,901,970 B2* | 1/2021 | Bernard ............... G06F 21/6218 |
| 2002/0073138 A1* | 6/2002 | Gilbert .................... G16Z 99/00 709/201 |
| 2011/0035414 A1* | 2/2011 | Barton .................. G06F 16/955 707/802 |
| 2016/0164679 A1* | 6/2016 | Song ..................... H04L 65/403 713/155 |
| 2016/0342812 A1* | 11/2016 | Lynch ................... H04W 12/02 |
| 2021/0281409 A1* | 9/2021 | Apsingekar ........... H04L 9/0894 |

(Continued)

FOREIGN PATENT DOCUMENTS

WO    WO2015166216 A1    11/2015

OTHER PUBLICATIONS

"Hashing Identifier" to Oracle Eloqua's Help Center, https://docs.oracle.com/en/cloud/saas/marketing/eloqua-user/Help/General/HashingIdentifier.htm, accessed on Jul. 6, 2021, 1 page.

*Primary Examiner* — Thanh T Le
(74) *Attorney, Agent, or Firm* — Bret E. Field; Bozicevic, Field & Francis LLP

(57) ABSTRACT

There is provided a computer-implemented method for secure linking of anonymized data among computer domains, comprising: at each computer domain at which a data set including a number of data records is stored: identifying a sensitive data element within a data record; applying a cryptographic hash function to the sensitive data element so as to yield a token; replacing the sensitive data element with the token within the data record to yield an anonymized data record of the data set; and transferring to a server computer the anonymized data record of the data set; and at the server computer: iteratively transforming the tokens of the anonymized data records of each data set to yield a compounded token for each token; and linking the anonymized data records if their compounded tokens match.

19 Claims, 18 Drawing Sheets

(56) References Cited

U.S. PATENT DOCUMENTS

| | | | | |
|---|---|---|---|---|
| 2023/0116631 A1* | 4/2023 | Le Bouthillier | .... | G06F 21/6209 726/26 |
| 2023/0153462 A1* | 5/2023 | Tutuianu | .................. | G06N 7/01 726/26 |

* cited by examiner

400

| iURN | IDNO_1 | PHONE_1 | SPEND | ... | dialResult | Retries | Error | TIMESTAMP |
|---|---|---|---|---|---|---|---|---|
| d0fdf2... | 7ab81... | 09f3efd3... | $540 | ... | (404) | 0 | No | 2021/08/19 12:43 |
| 04874... | 0e427... | 5444cec... | $1000 | ... | (603) | 1 | No | 2021/08/19 12:43 |
| 6dlf50... | 1ah60... | l76fja02c... | $955 | ... | (404) | 1 | No | 2021/08/19 12:43 |
| ... | ... | ... | ... | ... | ... | ... | ... | ... |

SYSTEM AND METHOD FOR SECURE LINKING OF ANONYMIZED DATA

FIELD OF THE INVENTION

This invention relates to a system and method for the anonymization and secure linking of data records among data sets provided by different computer domains. Further features of the system and method relate to the sharing of the linked data records among the different computer domains.

BACKGROUND TO THE INVENTION

Data sets containing a collection of information may provide valuable insights when analyzed, though a data set's usefulness may often be limited by its breadth (the number of records in the set) and depth (the number of data elements describing each record).

Entities may therefore sometimes wish to link their data sets to increase the usefulness of their sets but may be hesitant to do so when the records in their set contain sensitive data elements, such as personally identifiable information (PII). PII is information, such as a name or identification number, that can identify a particular entity or individual.

The sharing of sensitive data elements contained in a record may be subject to various protocols and/or restricted by regional legislation, privacy, security and/or other concerns, while the sharing of other data elements may have fewer or no restrictions. These other data elements may for example be information which describes a feature or behavior of an individual but cannot identify them.

Accessing additional data elements which are associated with a record but which are not sensitive can increase the depth of the data set and therefore its usefulness; however these elements often may not be shared due to their association with sensitive data elements.

Restrictions concerning the sharing and/or storing of sensitive data may be variable with time, location and other concerns, making it difficult to link data sets in a manner which meets the requirements of a broad entity base at all times. Integrating continuously updating requirements can be complicated and prone to error, and ensuring all entities party to the data sharing are fully integrated may not be guaranteed.

There is accordingly scope for improvement.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the invention there is provided a computer-implemented method for secure linking of anonymized data, comprising:
at a first computer domain at which a first data set including a number of data records is stored:
identifying a sensitive data element within a data record;
applying a cryptographic hash function to the sensitive data element so as to yield a token;
replacing the sensitive data element with the token within the data record to yield an anonymized data record of the first data set; and
transferring to a server computer the anonymized data record of the first data set;
at a second computer domain at which a second data set including a number of data records is stored:
identifying a sensitive data element within a data record;
applying a cryptographic hash function to the sensitive data element so as to yield a token;
replacing the sensitive data element with the token within the data record to yield an anonymized data record of the second data set; and
transferring to the server computer the anonymized data record of the second data set; at the server computer:
iteratively transforming the token of the anonymized data record of the first data set to yield a first compounded token;
iteratively transforming the token of the anonymized data record of the second data set to yield a second compounded token;
linking the anonymized data record of the first data set to the anonymized data record of the second data set if the first compounded token matches the second compounded token.

The server computer may be in a computing domain that is separate from both the first and the second computer domains. In one embodiment, the server computer is in a cloud computing domain.

Identifying a sensitive data element within the data record may be performed by using a machine learning method.

A record may include a number of data elements. Further features of the method may include having a category of sensitive data elements which has been predefined.

Identifying may include predicting that the category is present within the record.

Identifying may include mapping a data element to the category, thereby defining the data element as the sensitive data element. Mapping may include assessing the data elements conformity with the category and associating the data element with the category.

A record may include a field to which a data element belongs.

Identifying may include predicting a field within the record that corresponds to the category.

Identifying may include mapping a field to the category, thereby defining a data element belonging to the field as the sensitive data element. Mapping may include assessing a number of data elements within the field for conformity with the category and associating the field with the category.

The method may include normalizing the sensitive data element according to rules determined by the category to which the sensitive data element is mapped.

The cryptographic hash function may be applied to the sensitive data element according to rules determined by the category to which the sensitive data element is mapped.

The method may include adding a unique identifier to the anonymized data record prior to the anonymized record being transferred to the server computer.

Iteratively transforming the token of the anonymized data record of the first data set or of the anonymized data record of the second data set may include applying a cryptographic hash function to the token or an iteration of the token.

Iteratively transforming the token of the anonymized data record of the first data set or of the anonymized data record of the second data set may include adding a password to the token or an iteration of the token.

Iteratively transforming the token of the anonymized data record of the first data set or of the anonymized data record of the second data set may include applying a cryptographic hash function to a combination of a password and the token or an iteration of the token.

Iteratively transforming the token of the anonymized data record of the first data set or of the anonymized data record of the second data set may be according to rules determined by the category to which the sensitive data element of the first data set or the sensitive data element of the second data set, respectively, is mapped.

The method may include replacing the token of the anonymized data record of the first data set with the first compounded token. The method may include replacing the token of the anonymized data record of the second data set with the second compounded token.

Linking the anonymized data record of the first data set to the anonymized data record of the second data set may be in response to a request received from either the first computer domain or the second computer domain.

The method may further include at the server computer:
sharing with the first computer domain at least part of the anonymized data record of the second data set if:
a request is received by the server from the first computer domain; and
the anonymized data record of the first data set is linked to the anonymized data record of the second data set.

The at least part of the anonymized data record of the second data set may be shared with the first computer domain if the anonymized data record contains a data element which is associated with a parameter contained in the request. Only the data element of the anonymized data record may be shared, and not any token of the anonymized data record.

The sensitive data element may be personally identifiable information.

In accordance with a further aspect of the invention there is provided a system for secure linking of anonymized data records comprising:
at a first computer domain at which a first data set including a number of data records is stored:
a processor and a memory configured to provide computer program instructions to the processor to execute functions of components;
an identifying component configured to identify a sensitive data element within a data record;
a tokenizing component configured to a apply a cryptographic hash function to the sensitive data element to yield a token;
a replacing component configured to replace the sensitive data element with the token within the data record to yield an anonymized data record of the first data set; and
a transferring component configured to transfer to a server computer the anonymized data record of the first data set;
at a second computer domain at which a second data set including a number of data records is stored:
a processor and a memory configured to provide computer program instructions to the processor to execute functions of components;
an identifying component configured to identify a sensitive data element within a data record;
a tokenizing component configured to apply a cryptographic hash function to the sensitive data element so as to yield a token;
a replacing component configured to replace the sensitive data element with the token within the data record to yield an anonymized data record of the second data set; and
a transferring component configured to transfer to the server computer the anonymized data record of the second data set;
at the server computer:
a processor and a memory configured to provide computer program instructions to the processor to execute functions of components;
a transforming component configured to iteratively transform the token of the anonymized data record of the first data set to yield a first compounded token and iteratively transform the token of the anonymized data record of the second data set to yield a second compounded token;
a linking component configured to link the anonymized data record of the first data set to the anonymized data record of the second data set if the first compounded token matches the second compounded token.

In accordance with a further aspect of the invention there is provided a computer program product for the secure linking of anonymized data records, comprising:
at a first computer domain at which a first data set including a number of data records is stored:
a computer-readable medium having stored computer-readable program code for performing the steps of:
identifying a sensitive data element within a data record;
applying a cryptographic hash function to the sensitive data element so as to yield a token;
replacing the sensitive data element with the token within the data record to yield an anonymized data record of the first data set; and
transferring to a server computer the anonymized data record of the first data set;
at a second computer domain at which a second data set including a number of data records is stored:
a computer-readable medium having stored computer-readable program code for performing the steps of:
identifying a sensitive data element within a data record;
applying a cryptographic hash function to the sensitive data element so as to yield a token;
replacing the sensitive data element with the token within the data record to yield an anonymized data record of the second data set; and
transferring to the server computer the anonymized data record of the second data set;
at the server computer:
a computer-readable medium having stored computer-readable program code for performing the steps of:
iteratively transforming the token of the anonymized data record of the first data set to yield a first compounded token;
iteratively transforming the token of the anonymized data record of the second data set to yield a second compounded token;
linking the anonymized data record of the first data set to the anonymized data record of the second data set if the first compounded token matches the second compounded token.

Further features provide for the computer-readable medium to be a non-transitory computer-readable medium and for the computer-readable program code to be executable by a processing circuit.

Embodiments of the invention will now be described, by way of example only, with reference to the accompanying drawings.

BRIEF DESCRIPTION OF THE DRAWINGS

In the drawings:

FIG. 4 illustrates an embodiment of a data set as found in the service provider platform according to aspects of the present disclosure;

DETAILED DESCRIPTION WITH REFERENCE TO THE DRAWINGS

Aspects of the present disclosure relate to a system and method by which a service provider may securely link and share anonymized data records between at least two computer domains (for example, a first computer domain and a second computer domain), each having a data set including a number of data records, with each record having a number of data elements. The data elements may describe the record. The data set belonging to the first computer domain may be termed the "first data set," and the data set belonging to the second computer domain may be termed the "second data set".

The method may include, at the first computer domain, the first computer domain identifying a data element as a sensitive data element within a data record and tokenizing the sensitive data element. Tokenizing may include applying a cryptographic hash function to yield a token. The first computer domain may then replace the sensitive data element with the token within the data record to yield an anonymized data record of the first data set; and transfer to a server computer of a service provider platform the anonymized data record of the first data set.

The method may further include, at the second computer domain, the second computer domain identifying a data element as a sensitive data element within a data record, tokenizing the sensitive data element, and replacing the sensitive data element with the token within the data record to yield an anonymized data record of the second data set. The second computer domain may then transfer to the server computer the anonymized data record of the second data set.

The server computer may iteratively transform the token of the anonymized data record of the first data set and of the anonymized data record of the second data set to yield a first compounded token and a second compounded token, respectively. A compounded token may replace an original token within the anonymized data record. The records with their compounded token(s) may be stored in a database by the server computer as part of the service provider platform.

The server computer may link the anonymized data record of the first data set to the anonymized data record of the second data set if the first compounded token matches the second compounded token. In this way the server may link the anonymized data records from different computer domains without any sensitive data elements ever leaving a computer domain where those sensitive data elements are stored.

Though the functionality at the computer domains will be primarily described from the perspective of one computer domain ("the computer domain"), it should be appreciated that any number of computer domains may be connected to the service provider platform and implement the relevant steps of the method. Computer domains are to be understood as distinct and separate from each other.

Figure 1:
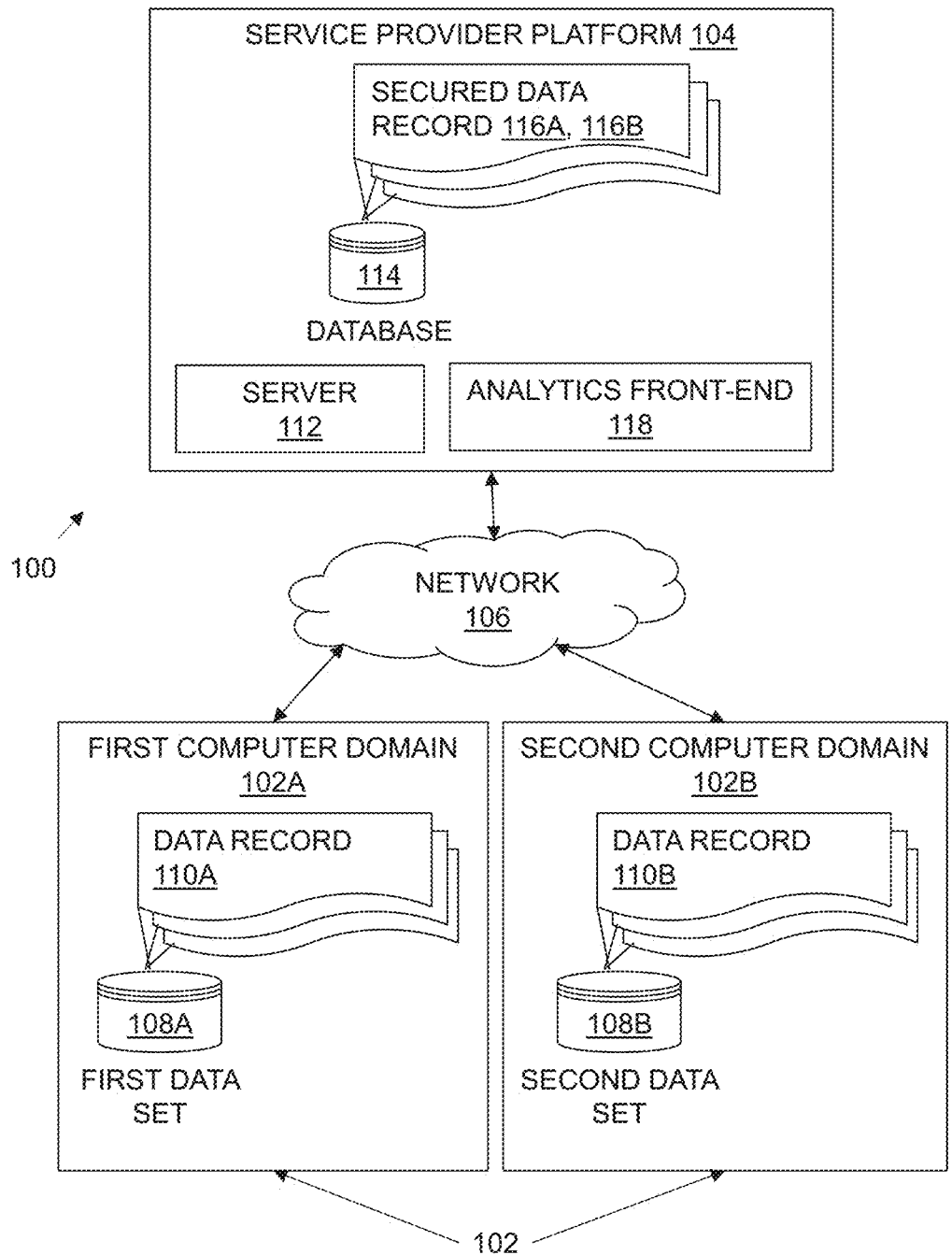
FIG. 1 is a schematic diagram which illustrates an exemplary system for the secure linking and sharing of anonymized data records according to aspects of the present disclosure.

FIG. 1 is a schematic diagram which illustrates an exemplary system (100) for the secure linking and sharing of anonymized data records according to aspects of the present disclosure. The system may include a number of computer domains, (for example a first computer domain (102A) and a second computer domain (102B)) connected to a service provider platform (104) via a network (106). The first computer domain (102A) may include a first data set (108A) containing a number of data records (110A). Similarly, the second computer domain (102B) may include a second data set (108B) containing a number of data records (110B).

The network (106) may be arranged to enable the service provider platform (104) to interact with the computer domains (102A, 102B) and may be implemented by any suitable network such as the Internet.

Each computer domain (hereinafter referred to as "the computer domain") (102) may be configured to interact with the service provider platform (104) and to prepare data for transfer to the same (104). A computer domain (102A, 102B) may be implemented by any suitable computing device or system of devices and may be configured to obtain data records, identify sensitive data elements within the records, anonymize the data records, and/or transfer the anonymized data records to the service provider platform (104). Typically, a computer domain (102A, 102B) is a specific secure domain which is logically separated from other domains and/or the network (106) by one or more firewalls or other access control measures. For example, a computer domain (102A, 102B) may be back-end servers hosted by or for a specific entity such as a company and accessible only to persons authorized by that entity.

The computer domain (102) may be accessed by a user. The user may be any individual or entity wishing to link data with another user. For example, the user may be a company, or a division of a company. The user may also be a third party analytics service having data records which a user who is a client of the service provider may wish to have its data records linked. The computer domain (102) may include a user interface through which the user interacts with the computer domain (102).

Figure 2:
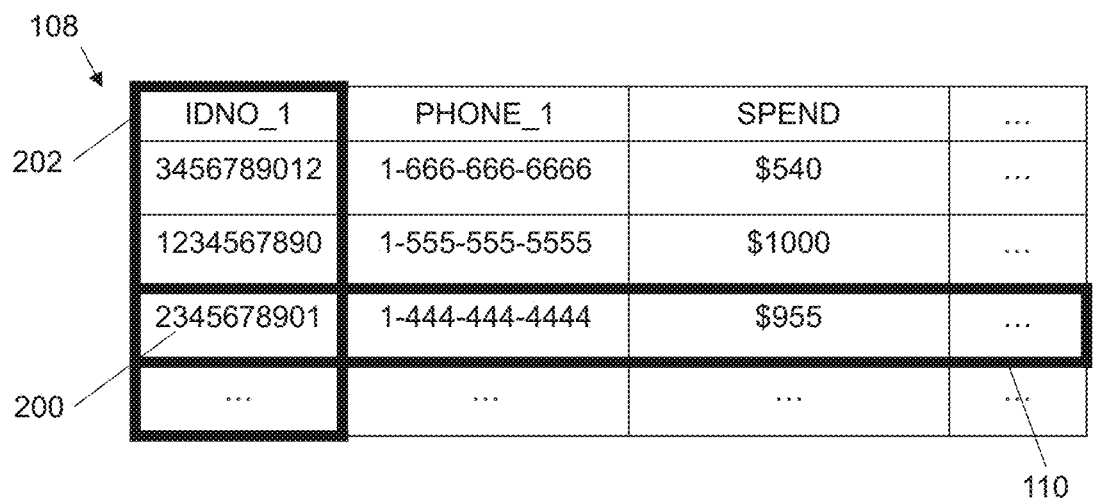
FIG. 2 illustrates an embodiment of a data set as found in the computer domain according to aspects of the present disclosure.

Referring to FIG. 2, the data contained at a computer domain may be a data set (108) containing a number of records. In an embodiment, the data set (108) may be implemented as a file (for example an Excel spreadsheet) in which a row represents an individual record (110), and a column represents a field (202) within the set (108). In another embodiment, the data set (108) may be implemented as a database (for example a SQL, MySQL, MariaDB, PostgreSQL database or the like). The database may include linked tables of fields.

A record (110) may contain data elements (200) which relate to an entity represented by the record (110). Data elements may be provided by the computer domain as part of the record. In some embodiments, data elements may be derived from other data elements by the computer domain or the service provider platform. The derived data elements may be added or appended to the record or records, or the derived data elements may replace previous data elements within the record or records.

Each data element (200) may belong to a field (202) describing the type of data element. Data elements which are considered sensitive may be found in fields which correspond to categories of sensitive data elements. A sensitive data element may be any data element (200) which must be protected against unauthorized disclosure. Sensitive data elements may be personally identifiable information such as a clients ID, passport number, name, surname, mobile subscriber integrated services digital network number (MSISDN), cell phone number, home phone number, email address and/or the like. Data elements may be considered sensitive as determined by various laws such as the General Data Protection Regulation (GDPR) but need not be limited to or correspond to such.

Each record (110) may include data elements belonging to various fields (for example, an ID number, phone number, personal spend and the like). The field may describe the type of data element. A field (202) may be a secondary embodiment of another field; for example a field representing a first phone number and a field representing a second phone number may be included within the same record (110). Some fields of data elements, such as the ID number and phone number, may be fields which correspond to predefined categories of sensitive data elements.

In some embodiments, more than one field (202) within a data record (110) or data set (108) may have the same category (for example, a first phone number field and a second phone number field may both be of the category "phone number"). Allowing for multiple fields within a category may improve the matching accuracy and provide flexibility within the linking process. For example, a person who has given only one phone number to a certain user and two phone numbers to another user may still be matched by the matching phone number, a match which may not have been possible if only one data element of the category "phone number" was allowed.

A category may be a field of data elements predefined by the service provider. A category may determine the handling of the data element (200). For example, a user may have a data set (108) which contains a record (110) for each of its clients. A data element representing a client's ID (and therefore of the "ID number" category) may be anonymized and secured with functions used specifically for data elements of the "ID number" category. Handling data elements according to their categories may improve security such that the hacking of a particular category of sensitive data elements may not compromise the entire data set.

Returning to FIG. 1, the computer domain (102) may be configured to identify sensitive data elements within a record or set of records. Identifying may be by way of a machine learning method. Identifying may include mapping data elements to categories. Identifying may include predicting the categories present in a set of records and mapping the data elements to the predicted categories. In another embodiment, identifying may include reading a schema which gives the categories present in a set of records, and mapping the data elements to the categories defined by the schema.

The computer domain (102) may further be configured to anonymize the data records. Anonymizing may include normalizing and tokenizing each sensitive data element within each data record. Normalizing may include formatting the data element to a standard format according to the category. Tokenizing may include applying a cryptographic hash function to the sensitive data element to produce a token. The computer domain (102) may be configured to replace the sensitive data element with the token, thereby producing an anonymized data record. The computer domain may be configured to transfer the anonymized data record to the service provider platform (104).

The computer domain (102) may include a firewall behind which the anonymization of data records takes place. Including a computer domain (102) configured to anonymize data records behind its firewall before transferring the anonymized data records to the service provider platform (104) may allow data to be shared between users without any sensitive data elements ever leaving the computer domain (102).

The system may further include a service provider platform (104). The service provider platform may include a server computer (112), a database (114) and an analytics front-end (118). The service provider platform (104) is preferably in a computing domain separate from both the first and second computer domains, and in one embodiment is in a cloud computing domain.

The server computer (112) may be configured to receive anonymized data records from the computer domains (102A, 102B), the records including tokens and other data elements. The server computer (112) may be configured to transform each token within the anonymized data records, thereby producing secured data records (116A, 116B).

Transforming each token may include applying a cryptographic hash function and/or adding a password to each token. Transforming may be iterative, with the result of each iteration replacing the previous token. The resulting token from the sequence of transformations may be termed a "secure compounded matching token" or a "compounded token." The compounded token may be stored with the other data elements comprising the record (116A, 116B) in the database (114) and may not be shared with the computer domains (102A, 102B). Records (116A, 116B) comprised of their compounded token(s) and other data elements may be termed "secured data records."

Figure 3:
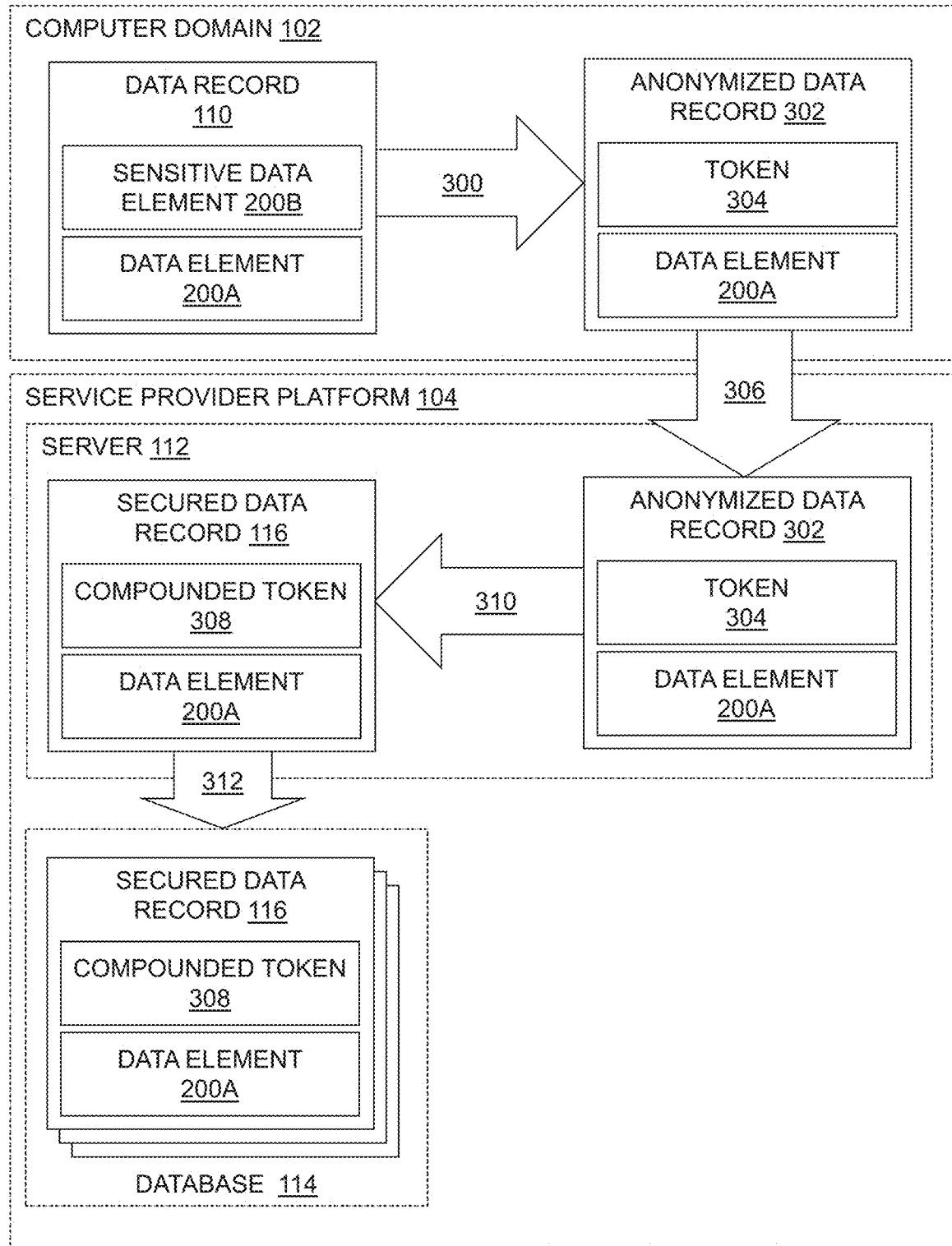
FIG. 3 is a flow diagram which illustrates the transformation of a data record during the anonymization process according to aspects of the present disclosure.

FIG. 3 is a flow diagram which illustrates the transformation of a data record during the anonymization process. The computer domain may have a data record (110) containing a number of data elements (200A) and sensitive data elements (200B). The computer domain (102) may tokenize each sensitive data element (200B), thereby producing (300)

an anonymized data record (302) containing a number of tokens (304) and data elements (200A), wherein the tokens (304) have replaced the sensitive data elements (200B) in the anonymized data record (302). The computer domain (102) may then transfer (306) the anonymized data record (302) to the server computer (112) within the service provider platform (104). The server computer (112) may then iteratively transform the tokens (304) in the anonymized data record (302) to produce compounded tokens (308), thereby changing (310) the anonymized data record (302) into a secured data record (116). The server computer (112) may then store (312) the secured data record (116), with its compounded tokens (308) and data elements (200A), within a database (114), and may delete the anonymized data record (302).

It should be appreciated that a data record may contain any number of sensitive data elements and data elements, and therefore a secured data record may contain any number of compounded tokens. It should further be appreciated that both the token produced by the computer domain and the compounded token produced by the server may be formed using one-way hashing algorithms that cannot feasibly be reversed or decrypted.

In one embodiment, sensitive data elements may be permanently irretrievable at the service provider platform (104) since the sensitive data elements within a record were hashed and replaced with the results of the hash functions.

In another embodiment, the computer domain may add a unique identifier, such as a globally unique identifier (GUID), as a data element to each anonymized data record prior to the anonymized record being transferred to the service provider platform. The unique identifier (also termed an "iURN") may be a random number which represents the location of the record within the original data set at the computer domain. Accessing the location within the computer domain where the original data record is stored may therefore reveal by association the original sensitive data element to the user of the computer domain. The unique identifier may be interpretable only to a specific computer domain, and therefore a record may be reidentified by the user without compromising the sensitive data element.

In a further embodiment, the user may be presented with the option as to whether each data record shall further include a unique identifier.

Returning to FIG. 1, the server computer (112) may be configured to store the secured data records (116A, 116B) in the database (114). The database may be any suitable database (for example a SQL, MySQL, MariaDB, PostgreSQL database or the like). Within the database (114), the secured data records may be grouped into data sets. The data sets may be separated by schema for each client.

FIG. 4 illustrates an exemplary data set (400) which may be stored in the database (114) according to aspects of the present disclosure. The data set (400) may contain a number of records with data elements belonging to various fields. Data elements (402) belonging to fields which correspond to categories of sensitive data elements (for example, data elements belonging to the IDNO_1 and PHONE_1 fields, which correspond to a first ID number and a first phone number category, respectively) may have been replaced with compounded tokens. Data elements (404) which do not correspond to categories (for example, data elements belonging to the SPEND field) may be stored without being anonymized or hashed. A unique identifier (406) may have been added to each data record and may also be stored.

Returning again to FIG. 1, the server computer (112) may be configured to compare compounded tokens to each other to match compounded tokens representing the same anonymized data element. Because hash functions are deterministic, the same normalized input may produce the same compounded token, irrespective of the computer domain from which it is transferred. In this way the associations between data elements within a record may be preserved in the anonymization process.

The server computer (112) may be configured to link records containing matching tokens. For example, the server computer may be configured to link a data record from the first data set to a data record from the second data set if at least one of their compounded tokens match.

The server computer (112) may be configured to output at least a part of the linked records and/or analyze the linked records. Linking data records may be in response to a request sent by a computer domain. The server computer may be further configured to output the results of the linking process and/or the analysis via an analytics front-end (118). The analytics front-end may be accessible to the computer domains and may be arranged to enable the users of the computer domains to interact with the linked data records. The linked records and/or output derived from the linked records may be accessible to the requesting computer domain and/or to the computer domains which transferred the involved datasets. The system may therefore be arranged to enable datasets from different users to be joined without sharing any of the underlying sensitive data elements.

The system (100) described may implement aspects of a method for the secure linking and anonymization of data records. Exemplary steps of a method for anonymizing a data record is illustrated in the swim lane flow diagram of FIG. 5, in which respective swim-lanes delineate operations performed by respective devices.

In one embodiment, the steps implemented by the computer domain may be automatically implemented with little to no user input at each step. In another embodiment, the computer domain may prompt the user, at one or more steps, to adjust various settings and/or to confirm proceeding. FIGS. 6A to 6F illustrate parts of exemplary screens of the user interface through which the user may be prompted and will be described with reference to FIG. 5.

Figure 6A:
FIGS. 6A-6F are exemplary screens provided by a user interface which display aspects of an embodiment of the present disclosure.

A computer domain (102) may obtain (502) a data record. The data record may be part of a data set. Obtaining a data record may be in response to a logging in to their account and adding a data set. For example, a user may log into their account via a log-in screen of the user interface, a log-in screen for example being as seen in FIG. 6A. Logging in may include signing in with an email address and a password. The computer domain (102) may then authenticate the user. The program used to obtain the data record is preferably part of the computer domain (102), such as a desktop application running on a particular company's servers behind its firewalls.

Figure 6B:
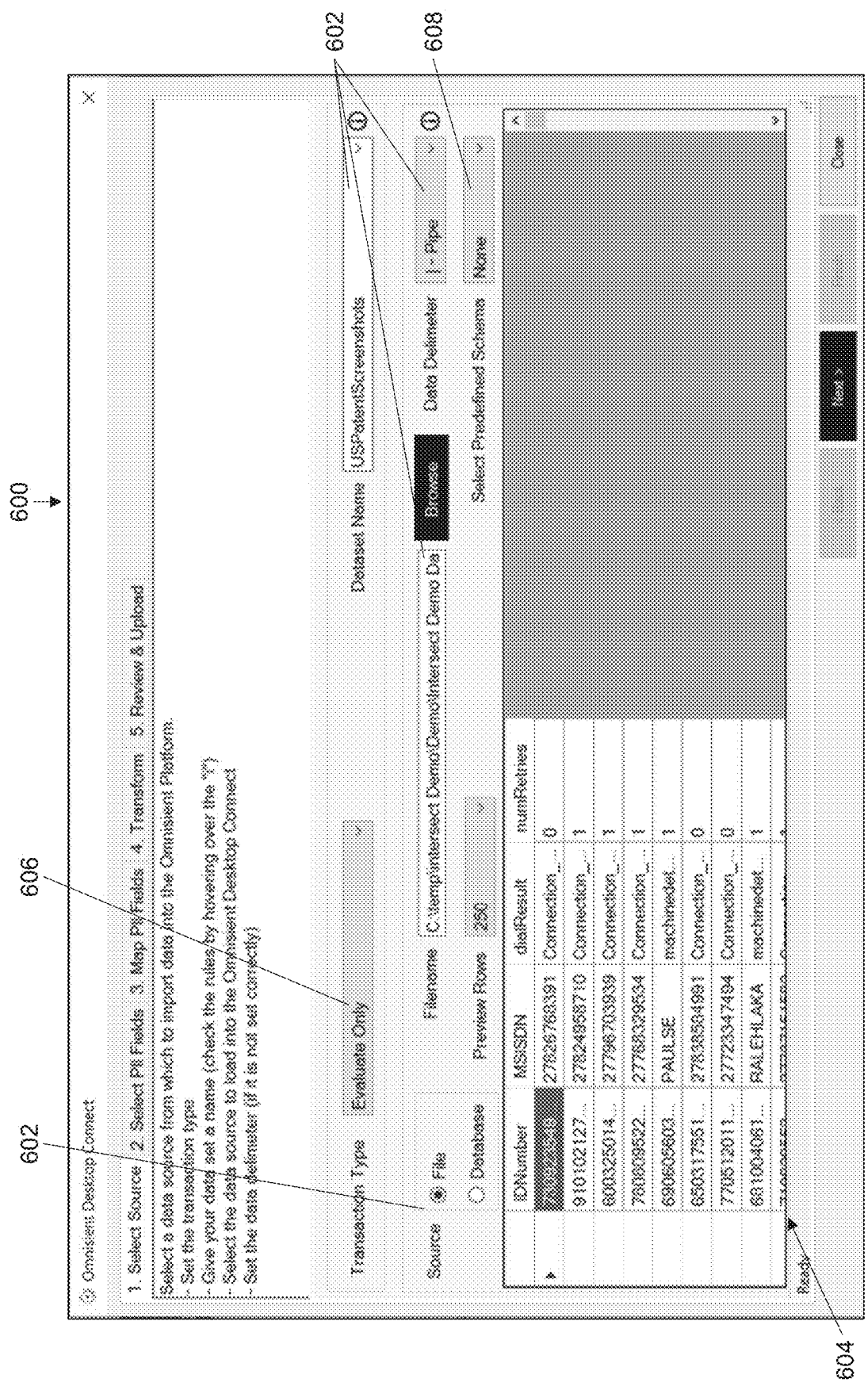

If the user is authenticated, the user may be prompted to select a number of settings relating to the file containing their data set via a screen (600) of the user interface, as seen in FIG. 6B. The screen (600) may include parts (602) which prompt the user to name the data set, to select the data source and/or to select the delimiter which separates the data elements. The data source may include the type of file (for example a spreadsheet file, database or the like) and/or the location of the data set within the computer domain (102). The user interface may display a preview (604) of the data set.

The computer domain (102) may also prompt the user to determine the transaction type which may indicate whether or not the records should include unique identifiers. Prompting may, for example, be by way of a menu (606) with options such as "evaluate only" and "trade enabled."

Selecting a transaction type of "evaluate only" may for example indicate that the linking of records may be for the purpose of analysis, and the sensitive data elements can therefore be tokenized without any unique identifier being added to the record. Selecting a transaction type of "trade enabled" may indicate that the records are intended to be shared or traded among users, and therefore a unique identifier may be included in the record. As previously described, the unique identifier may indicate the location of the record in the data set within the computer domain. The record as stored in the computer domain may still contain the sensitive data elements, thereby allowing a user to relocate the sensitive data element as stored in the computer domain (102).

The computer domain may identify (504) a sensitive data element or data elements within a record or set of records. Identifying may include predicting (506) if a category of sensitive data elements is present within the set of data records. For example, a computer domain may predict (506) which categories of sensitive data elements are present within the data set. Predicting categories may be by way of machine learning algorithms.

In an alternate embodiment, the user may be prompted to select a schema indicating the architecture of the file. The schema may indicate which categories of sensitive data elements are present in the data set. For example, if a user commonly stores their data sets with a name and address, the schema may indicate that the name category and address category are present within the data set, thus negating the need for predicting the presence of categories. In cases where data sets of frequent users contain definitive patterns or formats, having provisions for predefined schema may reduce computational time and potential errors.

In yet another embodiment, the user may have the option (608) to select a schema, and if no schema is detected, the computer domain may predict the categories.

Identifying may include mapping (508) a field of data elements to a category of sensitive data elements. Mapping (508) may include assessing one or more data elements' conformity with the category and associating the field with the category. Mapping fields to categories may reduce the computational time required to map each individual data element to a category.

In another embodiment, identifying may include mapping (508) each data element to a category of sensitive data elements. Mapping (508) may include assessing each data element's conformity with the category and associating the data element with the category. Mapping the data element to a category may allow the computer domain to detect a data element which has been wrongly placed in a field, thereby improving security of the anonymization process.

In one embodiment, predicting the presence of categories within a data set and/or mapping data elements to the relevant category may be automatically implemented by the computer domain without any user interaction. Automatic implementation may save time in cases where a user is confident in its data set, for example in the case when a user is a third-party analytics service.

Figure 6C:
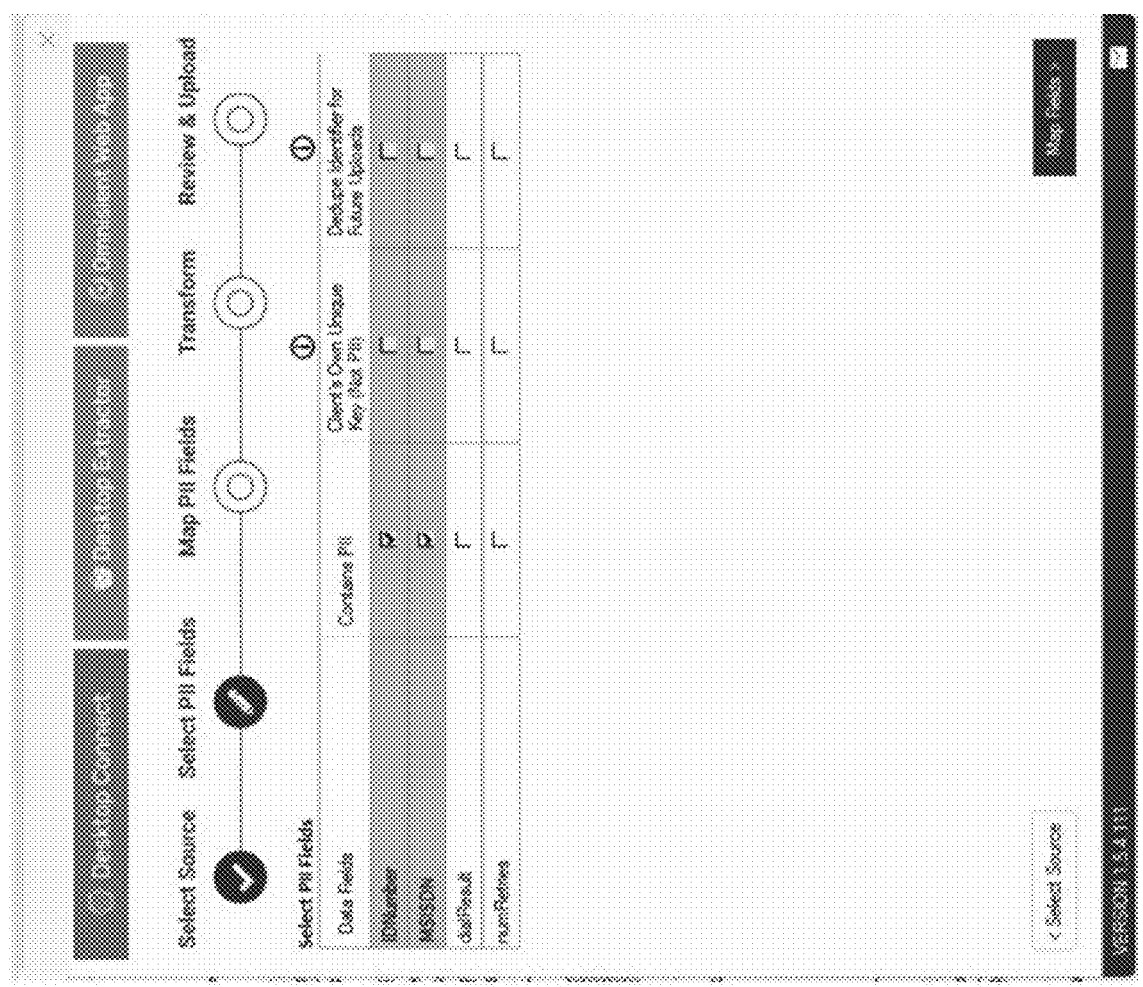
Figure 6D:
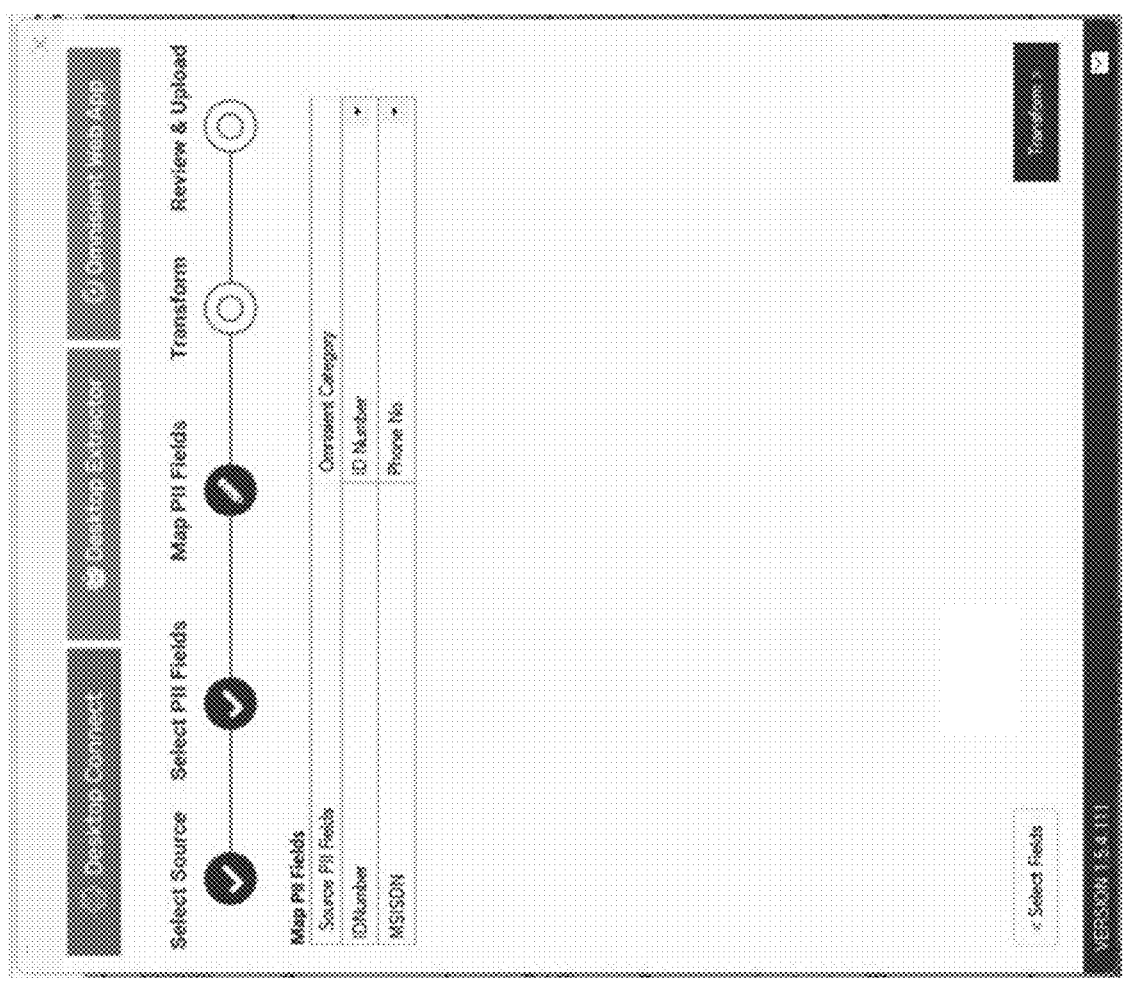
Figure 6E:
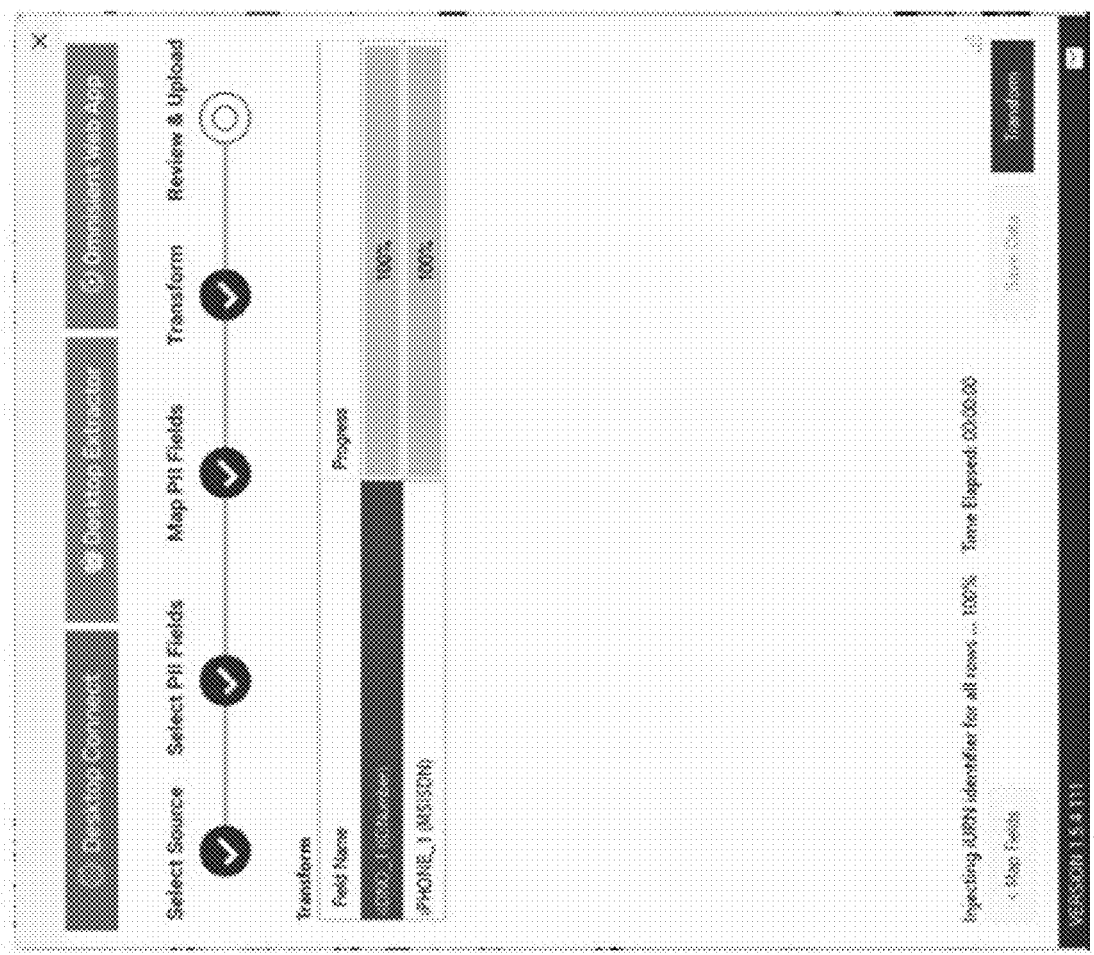
Figure 6F:
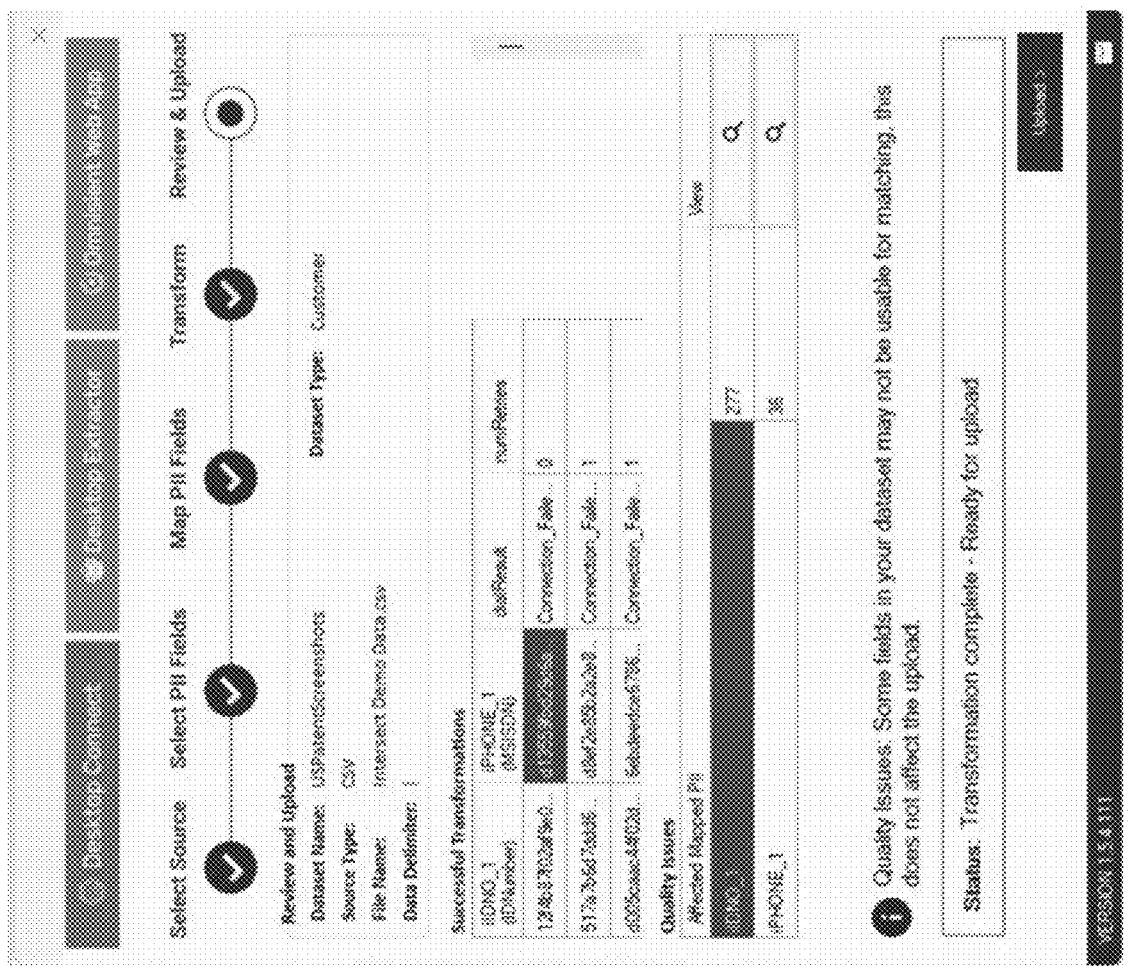

In another embodiment the computer domain (102) may output the predicted categories to the user interface and prompt the user to confirm a correct prediction, with an exemplary screen of the user interface illustrated in FIG. 6C. The computer domain (102) may prompt the user to proceed with mapping and output the results of the mapping to the user interface for the user to confirm, as seen in FIG. 6D. Prompting a user to confirm a prediction as correct rather than prompting a user to select the appropriate category may reduce the number of potential clerical errors if the user selects the category unaided.

The computer domain (102) may anonymize (510) the data record or set of data records. The computer domain may normalize, qualify and tokenize the data to make it ready for use by the server (112).

Anonymizing (510) the data record may include normalizing (512) the sensitive data elements within the record. The computer domain (102) may normalize (512) the data elements according to rules associated with a category. For example if a data element has been categorized as being of the "name" category, the data element may be formatted in a particular way associated with the "name" category (for example, additional white spaces may be removed and the capitalization may be standardized). Normalizing (512) the data elements may ensure that data elements representing the same information are consistently represented across computer domains irrespective of how they were entered into the data set. Since the hashing algorithms are deterministic, normalization may improve the accuracy of the matching process.

Anonymizing (510) the data record may include tokenizing the data element. Tokenizing (514) may be by way of applying a cryptographic hash function to the data element. The data element may be a normalized data element belonging to a category of sensitive data elements. Any suitable cryptographic hash function may be used, such as a secure hash algorithm (for example, SHA-256, SHA-512) or the like. The cryptographic hash function may be a one-way hash algorithm, wherein the data element is irretrievable from its hashed counterpart, or token. In another embodiment, tokenizing (514) may include other forms of encryption used in combination with or as an alternative to hashing.

The computer domain (102) may replace (516) the sensitive data elements with the produced tokens to produce an anonymized data record or a set of anonymized data records. The anonymized data record may be a modified copy of the data record.

The computer domain (102) may have an internal data quality framework which may qualify, analyze and/or identify issues with the data set. The computer domain may output data errors encountered during normalization to the user interface. The computer domain may display the anonymization progress on a screen of the user interface (as seen, for example in FIG. 6E) and/or prompt the user to save the outputted errors. Providing for the saving of an error report may increase the accuracy of the data linking by prompting the user to correct the data set prior to transferring to the server computer.

The computer domain (102) may transfer (518) the anonymized data record or the set of anonymized data records to the server computer (112), which is the first stage in which any of the data in the data records leaves the computer domain (102). In one embodiment, the set of anonymized data records may be displayed as a screen on the user interface (FIG. 6F) so that a user can confirm the data records have been encoded as intended before transferring to the server computer (112). In another embodiment, the anonymized data records may be automatically transferred to the server computer (112).

The server computer (112) may receive (520) the anonymized data record or set of anonymized data records from the computer domain (102) and transform (522) each token within the anonymized data record or records.

Transforming (522) the token may include applying (524) a cryptographic hash function to the token. Any suitable cryptographic hash function may be used, such as a secure hash algorithm (for example, SHA-256, SHA-512) or the like. Transforming (522) may include adding (526) a salt or a password to the token. Transforming (522) may include applying a cryptographic hash function to a combination of the token and password.

The method by which the server computer (112) transforms (522) the token may be specific to the category of sensitive data element to which the token belongs. For example, a token of a first category maybe hashed using algorithms which are different to those used to hash a token of a second category, and/or the passwords added to a token of a first category may be different to the passwords added to a token of a second category. The passwords may themselves be secured, for example through storage in an Azure vault.

The server computer (112) may iteratively transform the token n number of times, n being greater than or equal to 1, whereby the transforming (522) as described above may be applied to either the token or an iteration of the token. If (528) the number of times the token has been transformed is less than the required number of times, the server may transform the token again as described above by applying a cryptographic hash function either to an iteration of the token or a combination of the iteration and password.

The original token uploaded to the server may be replaced or overwritten by the subsequent results of the transformation. Transforming the token may produce a compounded token which replaces the token, producing a secured data record containing the compounded token and other data elements. The server computer (112) may store (530) the secured data record or records to a database.

Iteratively transforming the token may greatly improve the security of the anonymized data set. A compounded token produced by iterative transformations may be virtually impossible to hack because it introduces a number of variables too great to be overcome by traditional hacking methods. For example, without knowing the length of each password, the number of iterations performed, the hashing algorithms applied and the order in which the password and hashing algorithms are applied, trying enough possible combinations to resolve the token through the use of brute force attacks and/or rainbow tables may take an exorbitant amount of time and/or processing power that would make hacking the token impossible or infeasible.

Providing for the iterative transforming of the token may "future-proof" the data sets against security breaches, changes in legislation and/or technical advances such that in the event where a token has been compromised, legislation has changed or new security methods have been developed, the data sets may simply be further encrypted by layering additional iterations to the existing, compromised or antiquated set. Applying added iterations to the method (while also keeping the previous iterations in the method) may allow new data sets to be linked to old data sets because all data will still have been hashed with the same method. In this way, the associations between data records may still be preserved even in cases when the method is updated.

Figure 5:
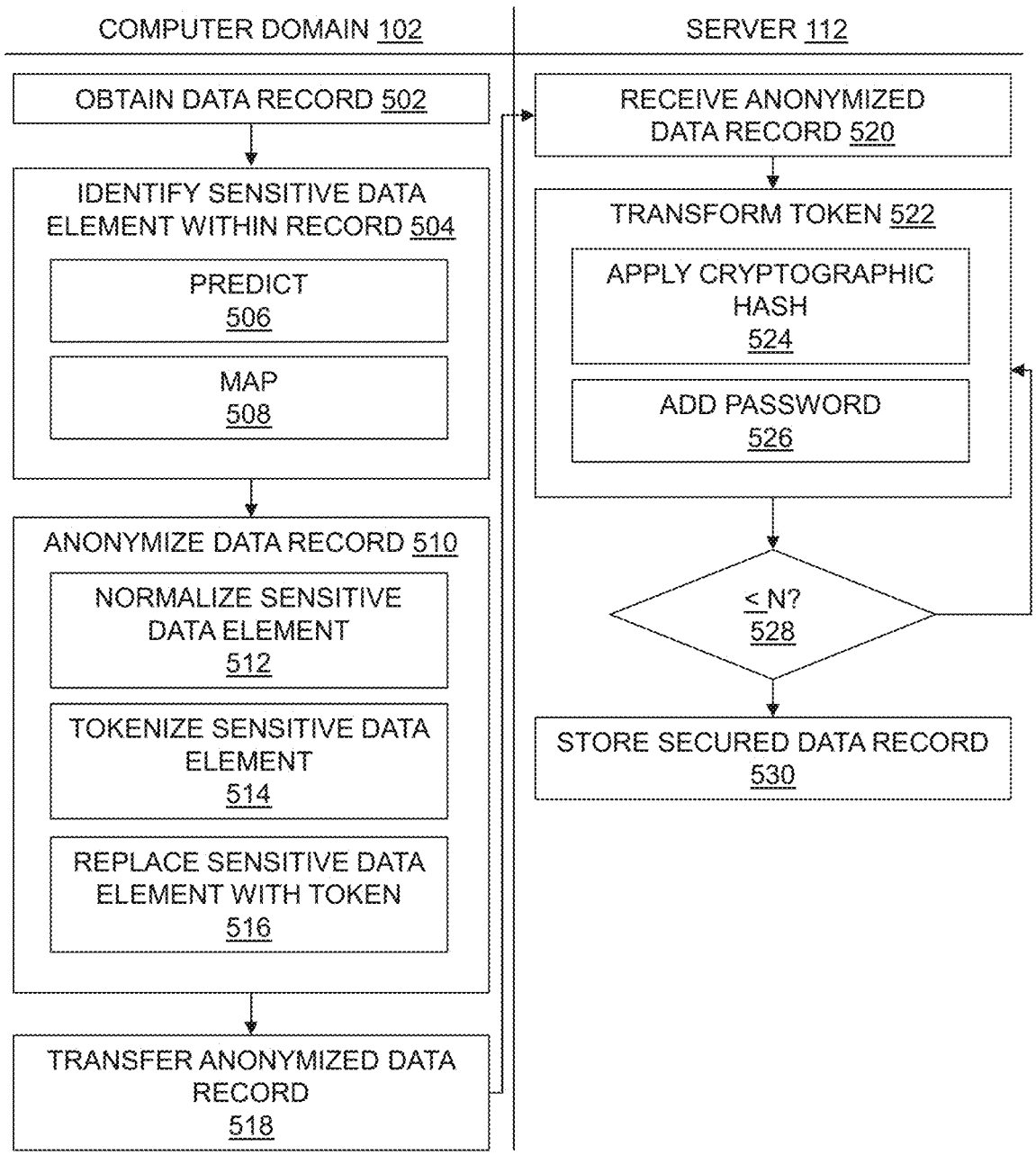
FIG. 5 is a flow diagram which illustrates exemplary steps by which each computer domain may upload anonymized data records to the server computer according to aspects of the present disclosure.

FIG. 5 illustrates exemplary steps by which each computer domain may upload anonymized data records to the server computer according to aspects of the present disclosure. The computer domain and/or server may implement any number of the steps of the method as a batch process of multiple records. The multiple records may comprise a data set.

Multiple computer domains may implement the relevant steps of the method in order to transfer anonymized data records to the server computer. If a first computer domain has transferred to the server computer a first data set of anonymized data records, and if a second computer domain has transferred to the server computer a second data set of anonymized data records, the server computer may link an anonymized data record of the first data set to an anonymized data record of the second data set if the anonymized record of the first data set and the anonymized data record of the second data set contain matching compounded tokens. The anonymized data records may be secured data records which were stored in the database. Linking may be implemented as a batch process for the joining or overlapping of datasets or parts thereof. Alternatively, linking may be implemented for the identification or retrieval of a specific record.

Figure 7:
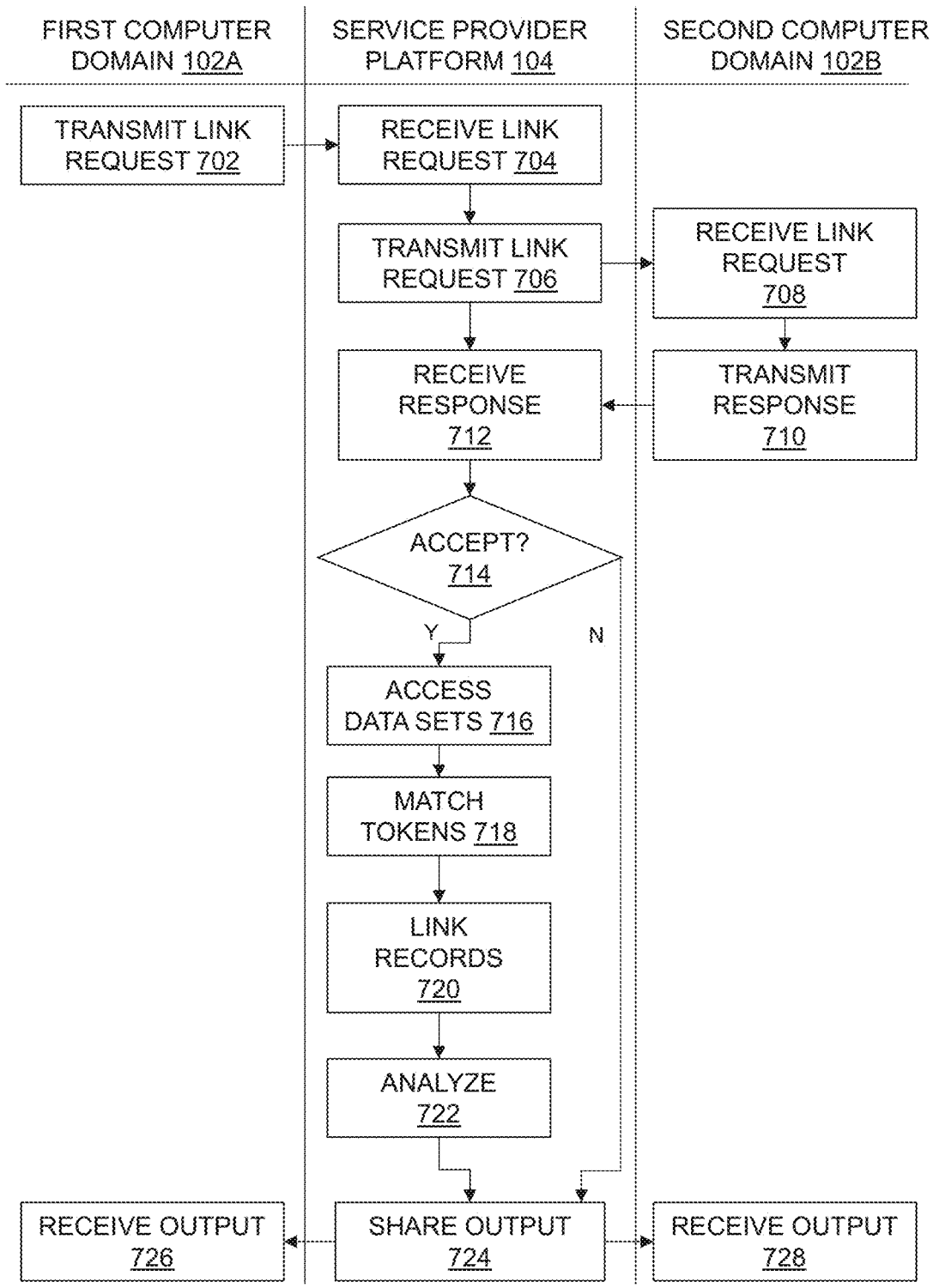
FIG. 7 is a swim-lane flow diagram illustrating exemplary linking steps according to aspects of the present disclosure.

FIG. 7 is a swim-lane flow diagram illustrating exemplary linking steps according to aspects of the present disclosure.

A first computer domain (102A) may transmit (702) a link request to the service provider platform (104). The link request may include which computer domain has a data set which is to be joined with a data set of the first computer domain (i.e. "the second computer domain" (102B)). The link request may indicate which data set belonging to the second computer domain is to be joined (i.e. "the second data set"). The link request may also include the nature of the transaction to be performed, for example if the joining of data sets is to be used for evaluation and/or analysis or for sharing data between computer domains.

The link request may further include a parameter which may limit the scope of the joined datasets. The parameter may be derived from at least a field within one of the datasets. The parameter may describe a general feature, such as personal spend. In some embodiments, the parameter may be indicated and applied after the data sets have been joined.

In other embodiments, the parameter may describe an identifying feature which limits the scope to the identification and/or manipulation of records pertaining to a single entity. For example, if the parameter is given as a sensitive data element (such as an ID), the sensitive data element may be hashed according to the method and the matching compounded tokens located at the service provider platform. The service provider platform may then link the records containing a compounded token representing the requested ID. The ability to link records pertaining to an individual entity may be restricted to cases where the entity has given consent for its data to be shared. In some embodiments, the server computer and/or computer domain may evaluate consent.

The method may include the service provider platform sharing with the first computer domain at least part of the anonymized data record of the second data set if: a request is received by the server from the first computer domain; and the anonymized data record of the second data set is linked to the anonymized data record of the first data set. In some embodiments, the service provider platform may share with the first computer domain at least part of the anonymized data record of the second data set if in addition, the anonymized data record contains a data element which is associated with a parameter contained in the request. Only the data element of the anonymized data record may preferably be shared, and not any token of the anonymized data record.

For example, a first company may wish to link its data set of clients with that of a second company. A first computer domain of the first company may transmit a link request to the service provider platform. The link request may indicate which data set belonging to the first company is to be linked to a data set belonging to the second company. The link request may also include a parameter, for example "personal spend over $500," which may limit the results of the joined data sets to records of clients found in both data sets and having a data element indicating a personal spend of over $500. If the first company also indicated that the transaction was to be for evaluation and analysis, the first company may receive through the first computer domain a visualization of the joined datasets limited by the parameter. If the first company indicated that the transaction was to be a trade, the first company may receive a list of unique identifiers corresponding to records of clients found in both datasets and having a data element indicating a personal spend of over $500.

In an alternate example, a first company may wish to link the features of its data set with that of a second company regarding a single client entity; for example a company may wish to produce a credit score for a client using data elements belonging to a data set of the second company. A first computer domain of the first company may transmit a link request to the service provider platform. The link request may indicate which record belonging to the first company is to be linked to a record belonging to the second company. The link request may include a parameter, for example the client's ID number, which may limit the results of the joined data sets to the records of the client found in both data sets. If the first company also indicated that the transaction was to produce a data element, such as a credit score, the first company may receive through the first computer domain a data element produced by the service provider (for example a credit score derived from a number of other data elements within the joined records).

The service provider platform (104) may receive (704) the link request from the first computer domain (102A) and may transmit (706) a link request to the second computer domain (102B). The second computer domain (102B) may receive (708) the link request and transmit (710) a response to the service provider platform (104). The response may include acceptance or consent to having its data set joined to that of the first computer domain (102A). The response may further include which data set or data sets belonging to the second computer domain (102B) may be linked to the data set of the first computer domain (102A).

The service provider platform (104) may receive (712) the response from the second computer domain (102B). If (714) the second computer domain (102B) has accepted the request, the service provider platform (104) may access (716) the relevant data sets.

The service provider platform (104) may match (718) compounded tokens which correspond or are identical to each other. The service provider platform (104) may search for, match and/or return corresponding tokens by using regular expressions, search algorithms or by relying on any other suitable method.

The service provider platform (104) may link (720) records having one or more corresponding compounded tokens. In an embodiment, the service provider platform (104) may link (720) records having a number of corresponding tokens equal to or exceeding a threshold number of corresponding compounded tokens.

The service provider platform (104) may further analyze (722) the results of the linking step and share (724) an output to the first computer domain (102A) and/or the second computer domain (102B). Analyzing may include deriving analytic data from joined data sets and/or the linked records. The output may include the results of or visualization of the analysis performed. The output may include parts of the linked data records, such as the unique identifiers. The unique identifiers may be used by the users to re-identify their records inside their respective domains. If the second computer domain did not accept the linking request, the output may be a notification of a linking failure.

In some embodiments, the service provider platform may use the results of the linking step and/or analysis to produce a data element which is appended to the associated record, or shared (724) as output to the requesting computer domain. Producing a data element may include performing operations on existing data elements. Performing operations may include deriving or implementing machine learning models using the results of the linking step. For example, the service provider may train a credit scoring model on the linked data of two joined data sets. The server computer may then automatically apply the model to a set of linked records pertaining to an individual entity to produce a credit score data element. The server computer may add the credit score to the existing record or records, or it may be outputted to the requesting computer domain.

Figure 8A:
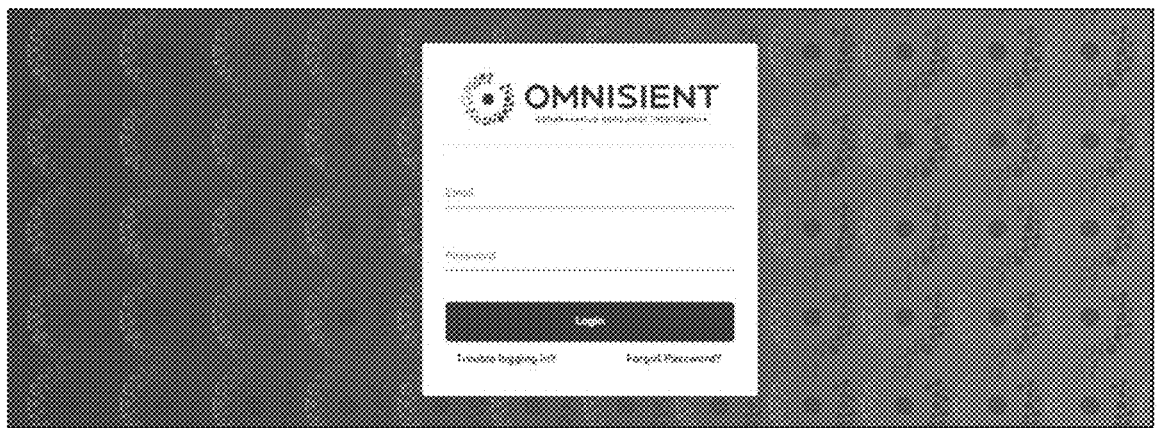
FIGS. 8A-8E are exemplary screens provided by a user interface which display aspects of an embodiment of the present disclosure.
Figure 8B:
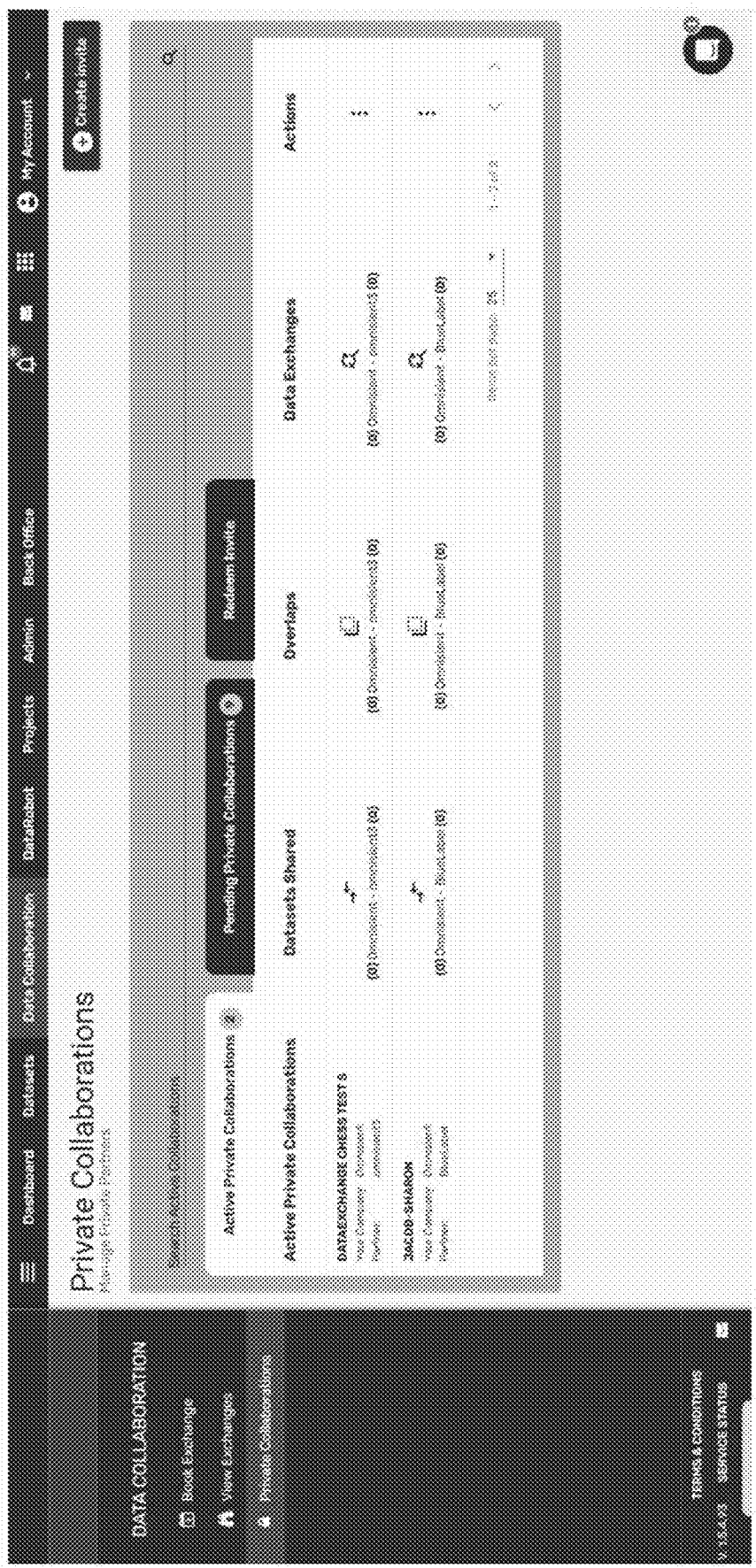
Figure 8C:
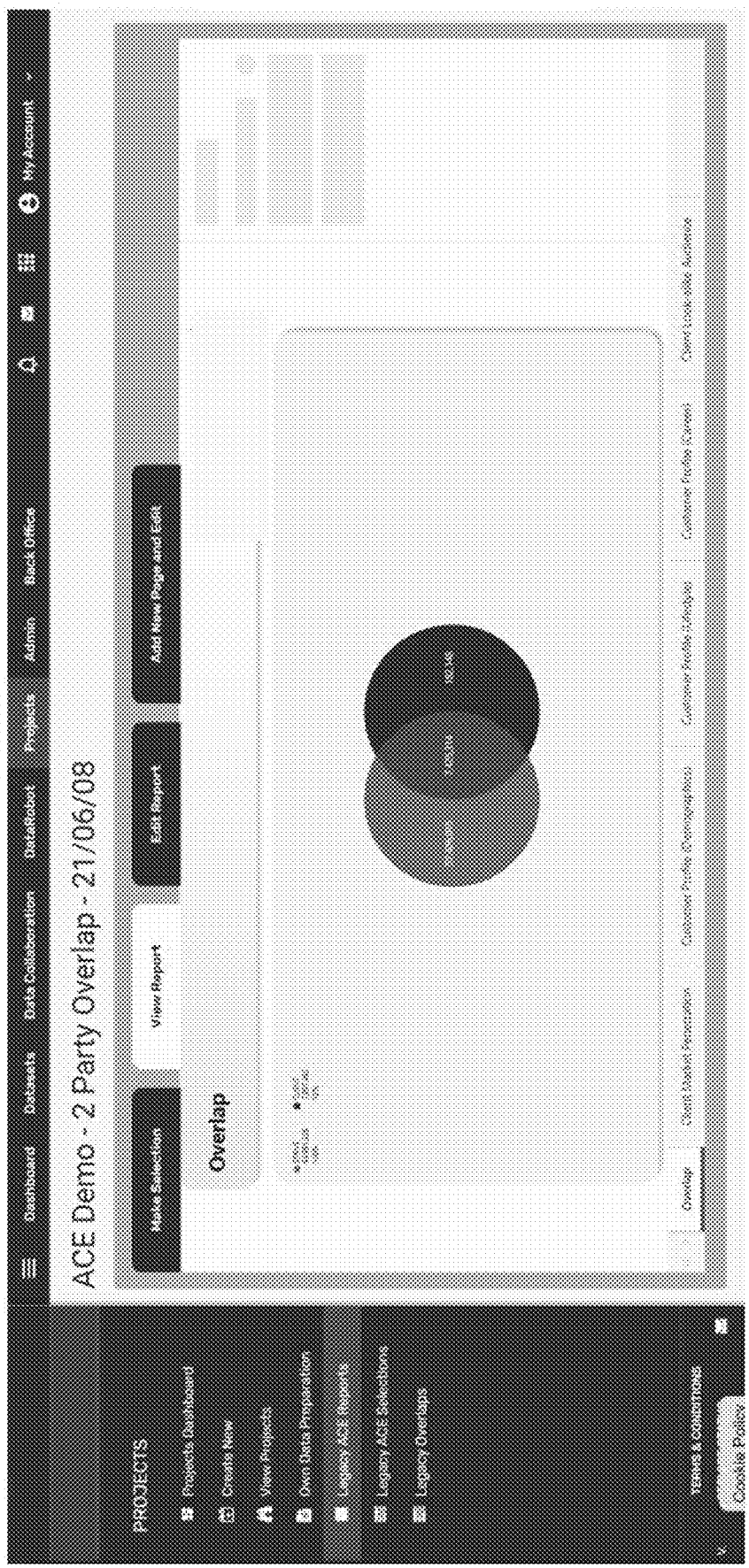

Requesting the linking of records within data sets may be implemented by various methods. In one embodiment the user of the first computer domain may be a client of the service provider. The user may request a number of its data sets be joined with a number of datasets of a second computer domain by logging into an account and sending an invitation to the user of the second domain, the request being via the analytics front-end of the service provider. An exemplary log-in screen included in the analytics front-end may be seen in FIG. 8A, and an exemplary table indicating the invitations sent by the user the first computer domain may be seen in FIG. 8B. The user of the second computer domain may send the response to the service provider by accepting or rejecting the invitation. If the user of the second computer domain has accepted, the secured data records may be linked and the results and/or a visualization of the results may be outputted to one or both of the computer domains via the analytics front end. An exemplary visualization of the joined data sets may be seen in FIG. 8C.

Figure 8D:

In another embodiment, the user may request a number of its datasets be joined with a number of datasets of a second computer domain by subscribing to the services offered by the user of the second computer domain. For example the user of the second computer domain may be a third party analytics service having a data set with which the user of the first computer domain would like to link the records contained in its datasets. The user of the second computer domain may send the response to the service provider by confirming a subscription. If the user at the second computer domain has accepted, the data sets may be joined. An exemplary visualization of the joined data sets may be seen in FIG. 8D.

Figure 8E:
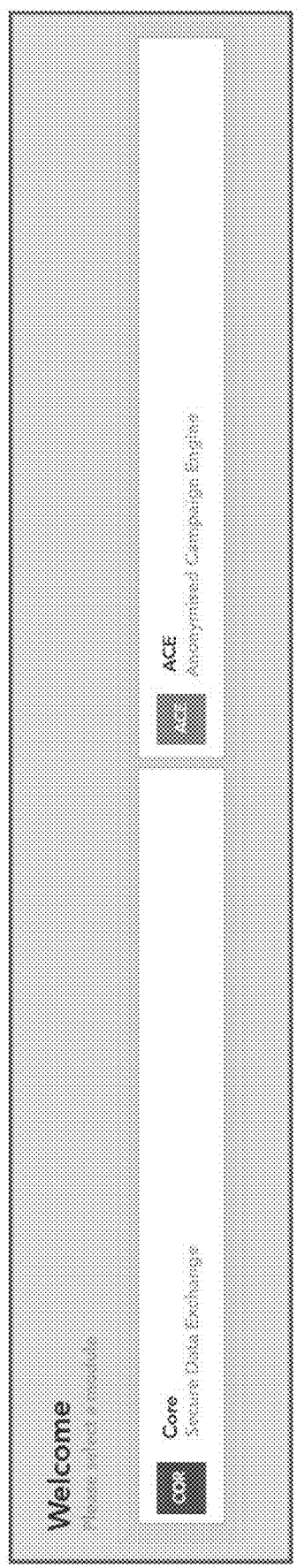

In another embodiment, the user may be provided with the option to send the request via either an invitation or a subscription by accessing an appropriate module within the analytics front end. An exemplary screen indicating a module by which a user of a first computer domain may invite a user of a second computer domain to collaborate, and a module by which a user of a first computer domain may subscribe to and/or access an analytics service is illustrated in FIG. 8E. Though only two modules are shown, it should be appreciated that a number of other modules providing other methods by which a user may request linking and/or various analytics services may be suitable.

Figure 9:
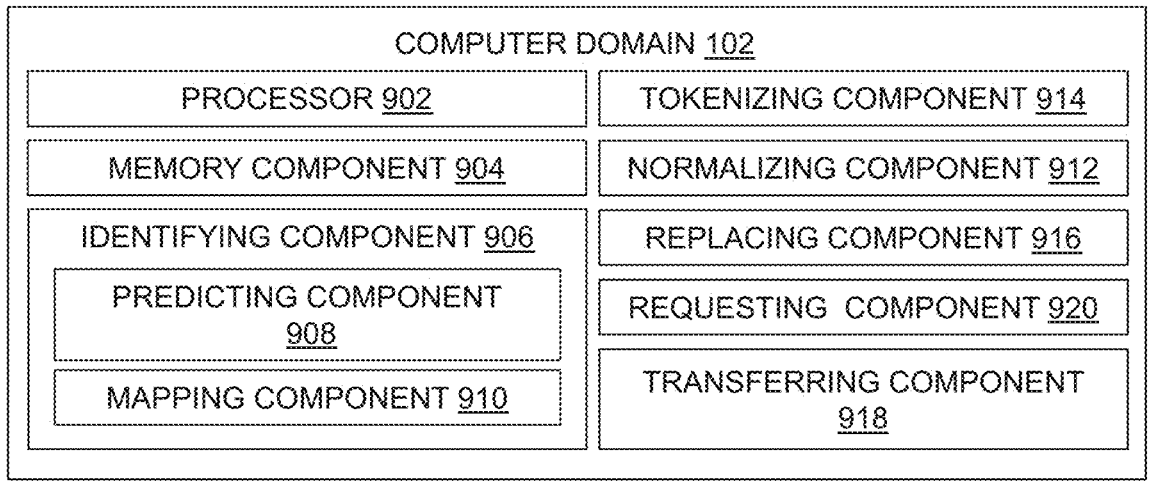
FIG. 9 is a block diagram which illustrates exemplary components of a computer domain which may be provided by a system for the secure linking of anonymized data records.
Figure 10:
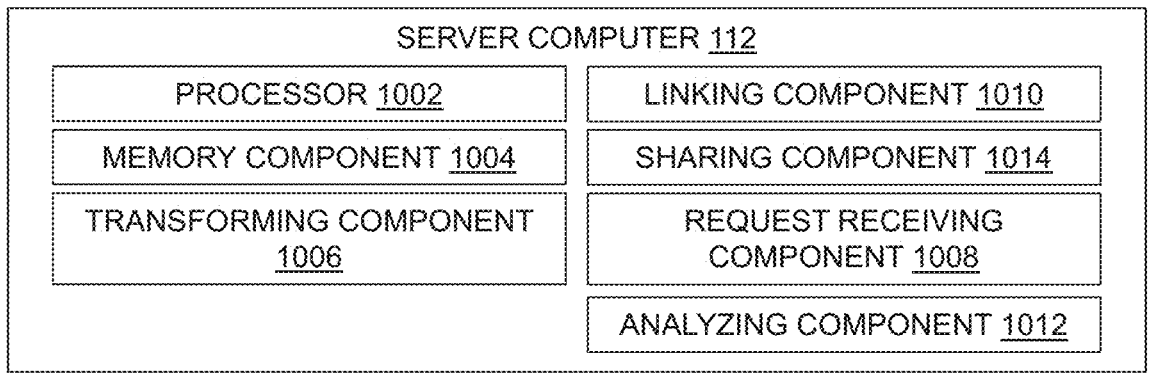
FIG. 10 is a block diagram which illustrates exemplary components of a server computer which may be provided by a system for the secure linking of anonymized data records.

Various components may be provided for implementing the method described above with reference to FIGS. 5 and 7. FIGS. 9 and 10 are block diagrams which illustrate exemplary components which may be provided by a system for the secure linking of anonymized data records.

The system may include multiple computer domains at which data sets containing a number of records are stored. A computer domain may include a processor (902) for executing the functions of components described below, which may be provided by hardware or by software units executing at or on the computer domain. The software units may be stored in a memory component (904) and instructions may be provided to the processor (902) to carry out the functionality of the described components.

The computer domain (102) may include an identifying component (906) arranged to identify a sensitive data element within a data record. An identifying component (906) may include a predicting component (908) arranged to predict if a data element is a sensitive data element and/or a mapping component (910) arranged to map the data element as a sensitive data element.

The computer domain (102) may include a normalizing component (912) arranged to normalize the sensitive data element. Normalizing include formatting the sensitive data element into a predefined format.

The computer domain (102) may include a tokenizing component (914) arranged to apply a cryptographic hash function to the sensitive data element to yield a token.

The computer domain (102) may include a replacing component (916) arranged to replace the sensitive data element with the token within the data record to yield an anonymized data record of the data set.

The computer domain (102) may include a transferring component (918) arranged to transfer to a server computer the anonymized data record of the data set.

The computer domain (102) may further include a requesting component (920) arranged to request that data records with matching compounded tokens be linked.

The server computer (112) may include a processor (1002) for executing the functions of components described below, which may be provided by hardware or by software units executing on the server computer. The software units may be stored in a memory component (1004) and instructions may be provided to the processor (1002) to carry out the functionality of the described components. In some cases, for example in a cloud computing implementation, software units arranged to manage and/or process data on behalf of the server may be provided remotely.

The server computer (112) may include a transforming component (1006) arranged to iteratively transform the token of the anonymized data record of the data set to yield a compounded token.

The server computer (112) may include a request receiving component (1008) arranged to receive a linking request from the computer domain.

The server computer (112) may include a linking component (1010) arranged to link an anonymized data record of a first data set to an anonymized data record of a second data set if one or more of their compounded tokens match.

The server computer (112) may include an analyzing component (1012) arranged to derive analytic data from the linked records.

The server computer (112) may include a sharing component (1014) arranged to share at least part of an anonymized data record with a computer domain.

Figure 11:
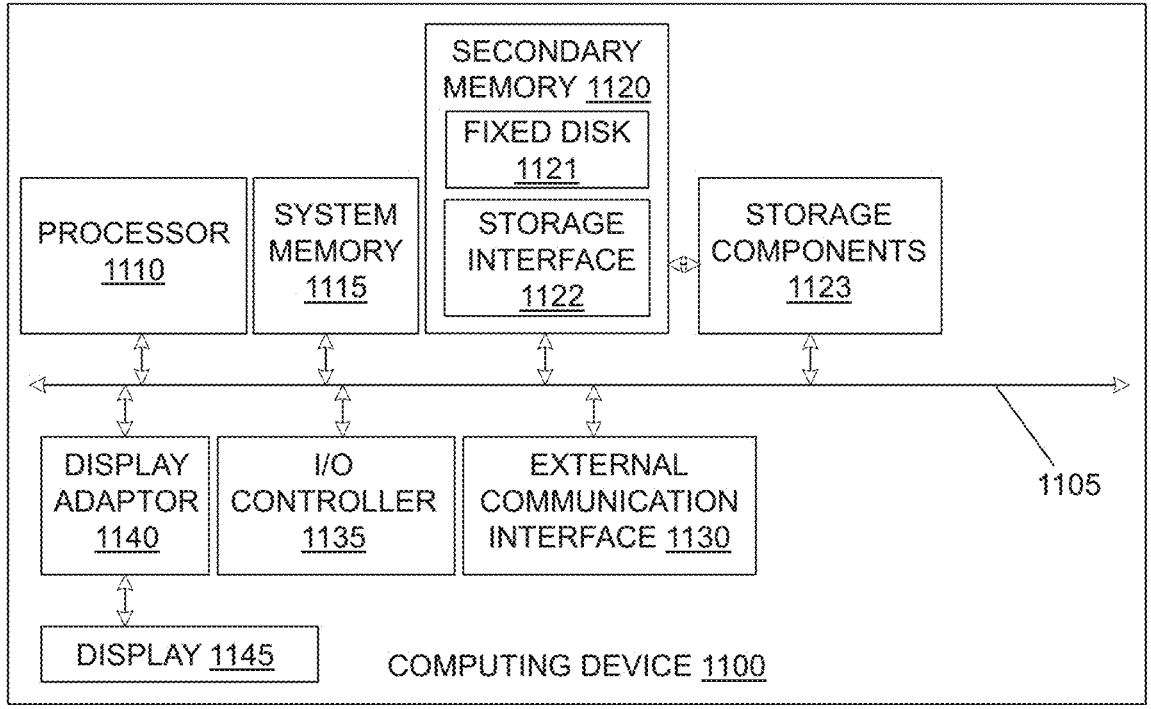
FIG. 11 illustrates an example of a computing device in which various aspects of the disclosure may be implemented.

FIG. 11 illustrates an example of a computing device (1100) in which various aspects of the disclosure may be implemented. The computing device (1100) may be embodied as any form of data processing device including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the computing device may dictate the inclusion or exclusion of various components or subsystems described below.

The computing device (1100) may be suitable for storing and executing computer program code. The various participants and elements in the previously described system diagrams may use any suitable number of subsystems or components of the computing device (1100) to facilitate the functions described herein. The computing device (1100) may include subsystems or components interconnected via a communication infrastructure (1105) (for example, a communications bus, a network, etc.). The computing device (1100) may include one or more processors (1110) and at least one memory component in the form of computer-readable media. The one or more processors (1110) may include one or more of: CPUs, graphical processing units (GPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing device (1100) may be distributed over a number of physical locations (e.g. in a distributed, cluster or cloud-based computing configuration) and appropriate software units may be arranged to manage and/or process data on behalf of remote devices.

The memory components may include system memory (1115), which may include read only memory (ROM) and random access memory (RAM). A basic input/output system (BIOS) may be stored in ROM. System software may be stored in the system memory (1115) including operating system software. The memory components may also include secondary memory (1120). The secondary memory (1120) may include a fixed disk (1121), such as a hard disk drive, and, optionally, one or more storage interfaces (1122) for interfacing with storage components (1123), such as removable storage components (e.g. magnetic tape, optical disk, flash memory drive, external hard drive, removable memory chip, etc.), network attached storage components (e.g. NAS drives), remote storage components (e.g. cloud-based storage) or the like.

The computing device (1100) may include an external communications interface (1130) for operation of the computing device (1100) in a networked environment enabling transfer of data between multiple computing devices (1100) and/or the Internet. Data transferred via the external communications interface (1130) may be in the form of signals, which may be electronic, electromagnetic, optical, radio, or other types of signal. The external communications interface (1130) may enable communication of data between the computing device (1100) and other computing devices including servers and external storage facilities. Web services may be accessible by and/or from the computing device (1100) via the communications interface (1130).

The external communications interface (1130) may be configured for connection to wireless communication channels (e.g., a cellular telephone network, wireless local area network (e.g. using Wi-Fi™), satellite-phone network, Satellite Internet Network, etc.) and may include an associated wireless transfer element, such as an antenna and associated circuitry.

The computer-readable media in the form of the various memory components may provide storage of computer-executable instructions, data structures, program modules, software units and other data. A computer program product may be provided by a computer-readable medium having stored computer-readable program code executable by the central processor (1110). A computer program product may be provided by a non-transient or non-transitory computer-readable medium, or may be provided via a signal or other transient or transitory means via the communications interface (1130).

Interconnection via the communication infrastructure (1105) allows the one or more processors (1110) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the computing device (1100) either directly or via an I/O controller (1135). One or more displays (1145) (which may be touch-sensitive displays) may be coupled to or integrally formed with the computing device (1100) via a display or video adapter (1140).

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. Components or devices configured or arranged to perform described functions or operations may be so arranged or configured through computer-implemented instructions which implement or carry out the described functions, algorithms, or methods. The computer-implemented instructions may be provided by hardware or software units. In one embodiment, a software unit is implemented with a computer program product comprising a non-transient or non-transitory computer-readable medium containing computer program code, which can be executed by a processor for performing any or all of the steps, operations, or processes described. Software units or functions described in this application may be implemented as computer program code using any suitable computer language such as, for example, Java™, C++, or Perl™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

Some portions of this description describe the embodiments of the invention in terms of algorithms and symbolic representations of operations on information. These algorithmic descriptions and representations, such as accompanying flow diagrams, are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention set forth in any accompanying claims.

Finally, throughout the specification and any accompanying claims, unless the context requires otherwise, the word 'comprise' or variations such as 'comprises' or 'comprising' will be understood to imply the inclusion of a stated integer or group of integers but not the exclusion of any other integer or group of integers.

The invention claimed is:

1. A computer-implemented method for secure linking of anonymized data, comprising:
    at a first computer domain at which a first data set including a number of data records is stored:
        identifying a sensitive data element within a data record;
        applying a cryptographic hash function to the sensitive data element so as to yield a token;
        replacing the sensitive data element with the token within the data record to yield an anonymized data record of the first data set; and
        transferring to a server computer the anonymized data record of the first data set;
    at a second computer domain at which a second data set including a number of data records is stored:
        identifying a sensitive data element within a data record;
        applying a cryptographic hash function to the sensitive data element so as to yield a token;
        replacing the sensitive data element with the token within the data record to yield an anonymized data record of the second data set; and
        transferring to the server computer the anonymized data record of the second data set;
    at the server computer:
        iteratively transforming the token of the anonymized data record of the first data set to yield a first compounded token;
        wherein iteratively transforming the token of the anonymized data record of the first data set or of the anonymized data record of the second data set includes applying a cryptographic hash function to a combination of a password and the token or a combination of a password and an iteration of the token; and linking the anonymized data record of the first data set to the anonymized data record of the second data set when the first compounded token matches the second compounded token.

2. The method as claimed in claim 1, wherein the server computer is in a computing domain that is separate from both the first and the second computer domains.

3. The method as claimed in claim 1, wherein a record includes a number of data elements, and the method includes having a category of sensitive data elements which has been predefined.

4. The method as claimed in claim 3, wherein identifying a sensitive data element includes predicting that the category is present within the record.

5. The method as claimed in claim 3, wherein identifying a sensitive data element includes mapping a data element to the category, thereby defining the data element as the sensitive data element.

6. The method as claimed in claim 5, wherein mapping includes assessing the data element's conformity with the category and associating the data element with the category.

7. The method as claimed in claim 3, wherein identifying a sensitive data element includes predicting a field within a record that corresponds to the category.

8. The method as claimed in claim 1, including normalizing the sensitive data element according to rules determined by a category of the sensitive data element.

9. The method as claimed in claim 1, wherein the cryptographic hash function is applied to the sensitive data element according to rules determined by a category of the sensitive data element.

10. The method as claimed in claim 1, including adding a unique identifier to the anonymized data record of the first data set or the anonymized record of the second data set prior to the anonymized record being transferred to the server computer.

11. The method as claimed in claim 1, wherein iteratively transforming the token of the anonymized data record of the first data set or of the anonymized data record of the second data set includes applying a cryptographic hash function to the token or an iteration of the token.

12. The method as claimed in claim 1, wherein iteratively transforming the token of the anonymized data record of the first data set or of the anonymized data record of the second data set includes adding a password to the token or an iteration of the token.

13. The method as claimed in claim 1, wherein iteratively transforming the token of the anonymized data record of the first data set or of the anonymized data record of the second data set according to rules determined by a category of the sensitive data element of the first data set or the sensitive data element of the second data set.

14. The method as claimed in claim 1, including replacing the token of the anonymized data record of the first data set with the first compounded token and replacing the token of the anonymized data record of the second data set with the second compounded token.

15. The method as claimed in claim 1, including linking the anonymized data record of the first data set to the anonymized data record of the second data set in response to a request received from either the first computer domain or the second computer domain.

16. The method as claimed in claim 1, including at the server computer:
sharing with the first computer domain at least part of the anonymized data record of the second data set when:
a request is received by the server from the first computer domain; and the anonymized data record of the first data set is linked to the anonymized data record of the second data set.

17. The method as claimed in claim 16, wherein the at least part of the anonymized data record of the second data set shared with the first computer domain when the anonymized data record contains a data element which is associated with a parameter contained in the request.

18. A system for secure linking of anonymized data records comprising:
at a first computer domain at which a first data set including a number of data records is stored:
a processor and a memory configured to provide computer program instructions to the processor to execute functions of components;
an identifying component configured to identify a sensitive data element within a data record;
a tokenizing component configured to a apply a cryptographic hash function to the sensitive data element to yield a token;
a replacing component configured to replace the sensitive data element with the token within the data record to yield an anonymized data record of the first data set; and
a transferring component configured to transfer to a server computer the anonymized data record of the first data set;
at a second computer domain at which a second data set including a number of data records is stored:
a processor and a memory configured to provide computer program instructions to the processor to execute functions of components;
an identifying component configured to identify a sensitive data element within a data record;
a tokenizing component configured to apply a cryptographic hash function to the sensitive data element so as to yield a token;
a replacing component configured to replace the sensitive data element with the token within the data record to yield an anonymized data record of the second data set; and
a transferring component configured to transfer to the server computer the anonymized data record of the second data set;
at the server computer:
a processor and a memory configured to provide computer program instructions to the processor to execute functions of components;
a transforming component configured to iteratively transform the token of the anonymized data record of the first data set to yield a first compounded token and iteratively transform the token of the anonymized data record of the second data set to yield a second compounded token, wherein iteratively transforming the token of the anonymized data record of the first data set or of the anonymized data record of the second data set includes applying a cryptographic hash function to a combination of a password and the token or a combination of a password and an iteration of the token; and
a linking component configured to link the anonymized data record of the first data set to the anonymized data record of the second data set when the first compounded token matches the second compounded token.

19. A computer program product for the secure linking of anonymized data records, comprising:
- at a first computer domain at which a first data set including a number of data records is stored:
  - a computer-readable medium having stored computer-readable program code for performing the steps of:
  - identifying a sensitive data element within a data record;
  - applying a cryptographic hash function to the sensitive data element so as to yield a token;
  - replacing the sensitive data element with the token within the data record to yield an anonymized data record of the first data set; and
  - transferring to a server computer the anonymized data record of the first data set;
- at a second computer domain at which a second data set including a number of data records is stored:
  - a computer-readable medium having stored computer-readable program code for performing the steps of:
  - identifying a sensitive data element within a data record;
  - applying a cryptographic hash function to the sensitive data element so as to yield a token;
  - replacing the sensitive data element with the token within the data record to yield an anonymized data record of the second data set; and
  - transferring to the server computer the anonymized data record of the second data set;
- at the server computer:
  - a computer-readable medium having stored computer-readable program code for performing the steps of:
  - iteratively transforming the token of the anonymized data record of the first data set to yield a first compounded token;
  - iteratively transforming the token of the anonymized data record of the second data set to yield a second compounded token;
  - wherein iteratively transforming the token of the anonymized data record of the first data set or of the anonymized data record of the second data set includes applying a cryptographic hash function to a combination of a password and the token or a combination of a password and an iteration of the token; and
  - linking the anonymized data record of the first data set to the anonymized data record of the second data set when the first compounded token matches the second compounded token.

* * * * *